United States Patent [19]

Heaviside et al.

[11] 3,903,610

[45] Sept. 9, 1975

[54] APPARATUS FOR MEASURING MAGNETIC FIELD DIRECTION

[75] Inventors: John B. Heaviside, Huntington; Franklin W. Smith, Jr., Hauppauge, both of N.Y.

[73] Assignee: North Atlantic Industries, Inc., Plainview, N.Y.

[22] Filed: Oct. 4, 1972

[21] Appl. No.: 294,918

Related U.S. Application Data

[63] Continuation-in-part of Ser. No. 282,002, Aug. 18, 1972.

[52] U.S. Cl. .................................... 33/361; 324/47
[51] Int. Cl. ............................................ G01c 17/28
[58] Field of Search ............. 33/361; 324/0.5 E, 47; 323/121, 129

[56] References Cited

UNITED STATES PATENTS

| | | | |
|---|---|---|---|
| 3,237,012 | 2/1966 | Treffeisen | 250/219 |
| 3,237,584 | 3/1966 | Keithley | 33/363 R UX |
| 3,355,705 | 11/1967 | Koerner | 33/361 X |
| 3,601,899 | 8/1971 | Artz | 33/361 |
| 3,634,946 | 1/1972 | Star | 33/357 |

FOREIGN PATENTS OR APPLICATIONS

| | | | |
|---|---|---|---|
| 451,850 | 8/1936 | United Kingdom | 33/361 |
| 98,414 | 3/1940 | Sweden | 33/361 |
| 1,204,365 | 9/1970 | United Kingdom | 323/129 |
| 579,439 | 8/1946 | United Kingdom | 33/361 |
| 45-33484 | 10/1970 | Japan | 323/121 |
| 2,040,552 | 3/1971 | Germany | 33/361 |
| 930,695 | 7/1963 | United Kingdom | 33/357 |

*Primary Examiner*—William D. Martin, Jr.
*Attorney, Agent, or Firm*—Morgan, Finnegan, Durham & Pine

[57] ABSTRACT

Techniques and apparatus involving the use of flux sensors for measuring the direction of magnetic fields are disclosed herein including, as an exemplary embodiment, a magnetic field direction sensing compass which provides a digital display of heading as well as the ability to set in a desired course and monitor the degree to which that selected course is followed. Special error correction techniques are also disclosed including the electrical correction for megnetic variation and the electrical compensation for deviation errors. Also taught are techniques for data averaging prior to display.

22 Claims, 10 Drawing Figures

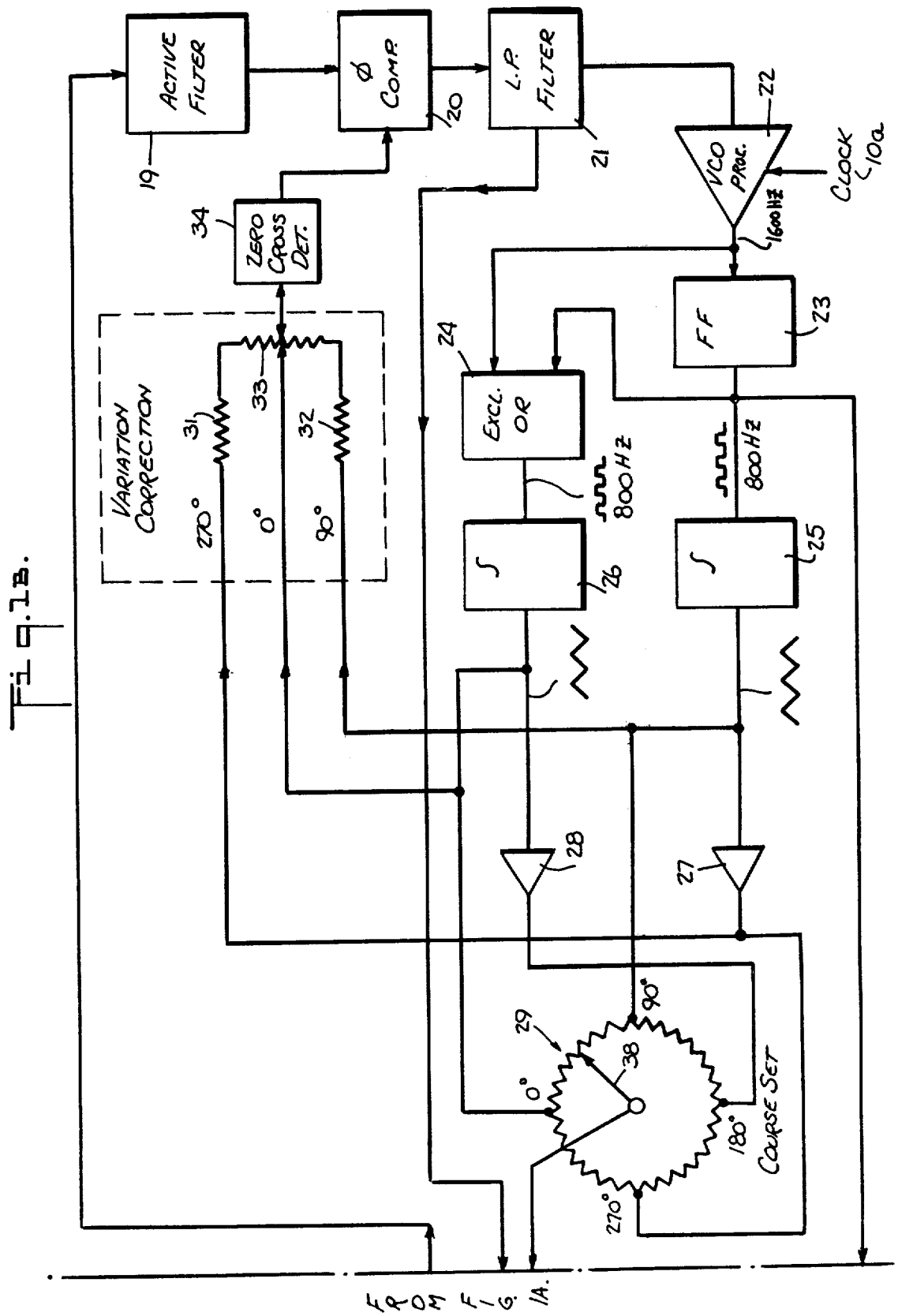

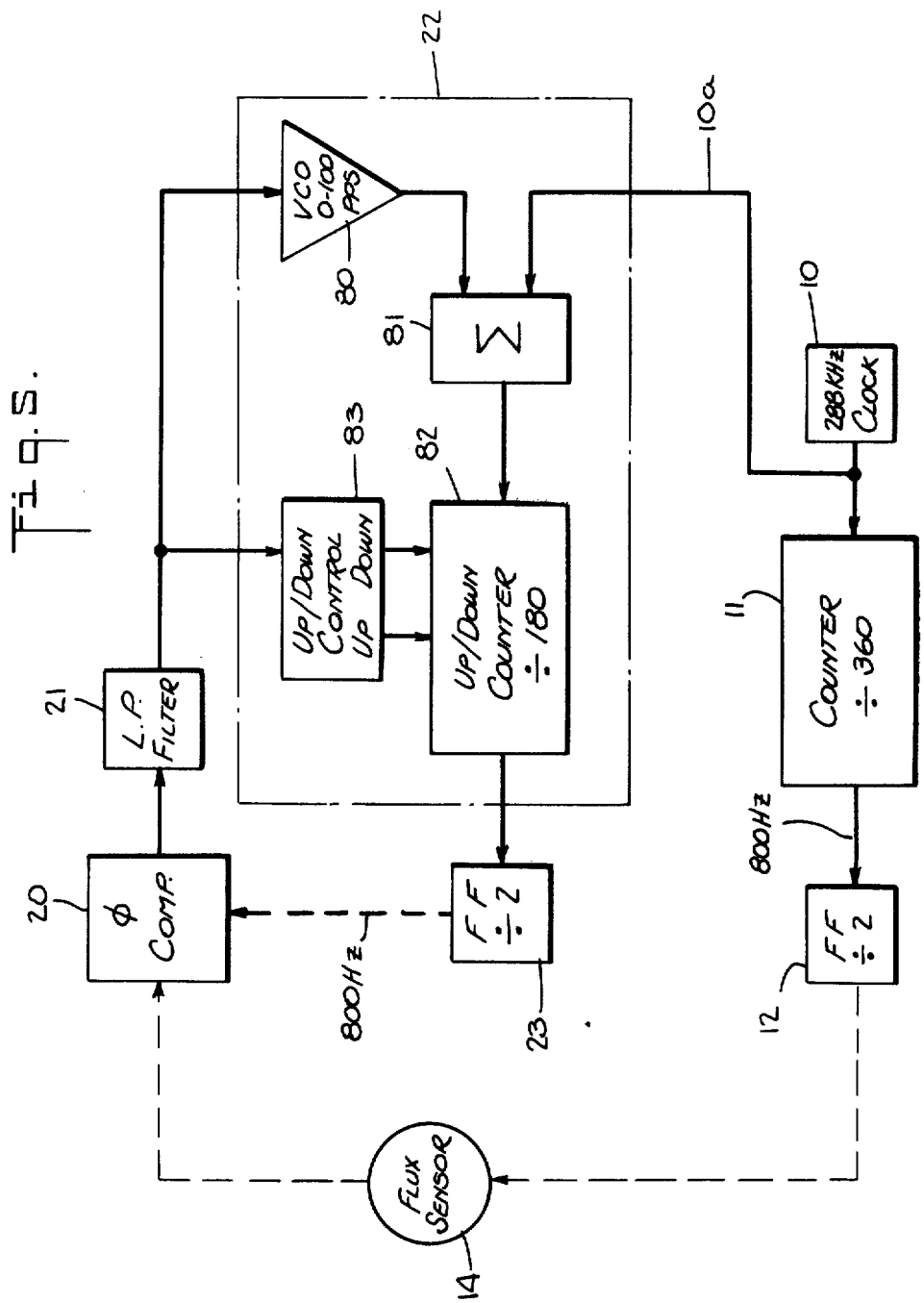

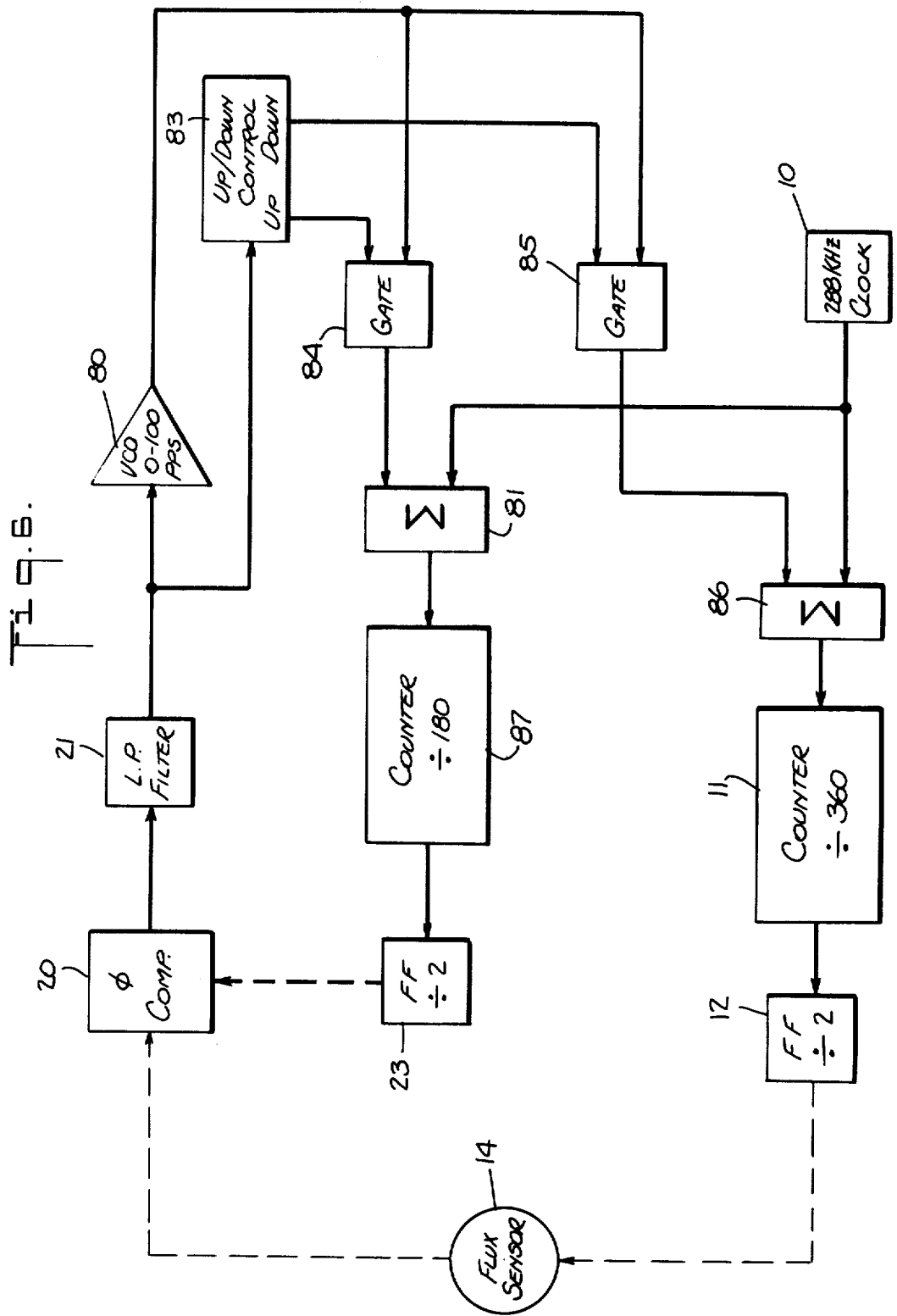

APPARATUS FOR MEASURING MAGNETIC FIELD DIRECTION

RELATED APPLICATIONS

'‑s application is a continuation-in-part of application ,er. No. 282,002 filed Aug. 18, 1972.

BACKGROUND AND BRIEF SUMMARY OF THE INVENTION

The invention disclosed herein relates to techniques and devices for sensing the direction of magnetic fields and deriving useful information therefrom. More particularly, this invention relates to devices for sensing the direction of a magnetic field, also referred to as north sensing magnetic devices. A north seeking magnetic device is one utilizing a movable element which seeks a preferred orientation in response to the presence of a magnetic field. In contrast, a north sensing device does not rely upon the physical movement of a sensing element to generate data related to the magnetic field but, rather, directly senses the magnetic field.

In one embodiment, the present invention relates to north sensing marine compasses which are adapted to provide a digital readout of heading, i.e., the angle $\theta$ between the ship's direction and the horizontal component of the earth's magnetic field vector.

Techniques for measuring the relative direction of the earth's magnetic field are old. For example, pivoted needle magnetic compasses have been known and used for hundreds of years. A survey of various types of magnetic compasses and magnetometers is contained in a book entitled "Magnetic Compasses and Magnetometers," Alfred Hine, University of Toronto Press (1968).

When navigating with conventional north seeking compasses, it is necessary to correct for the magnetic "variation," i.e., the difference between true north and magnetic north. This variation is a function of location on (or above) the earth's surface. In accordance with the present invention there is provided a simple, inexpensive means for electrically correcting for this variation so that the compass will automatically indicate heading with respect to true north. This is another substantial advantage of the present invention.

In addition to correcting for magnetic variation, it is necessary to correct for magnetic "deviation," i.e., magnetic errors induced by the presence of local ferrous metal and/or DC currents. With conventional compasses, compensation is effected by manipulating an array of magnets so as to minimize the deviation errors. In accordance with the present invention, however, it is possible to electrically compensate for various types of deviation errors, another substantial advance.

The nature of the conventional north seeking magnetic compass is such that the north seeking magnet must be damped in order to present a display sufficiently stable to be accurately viewed. A necessary consequence of this damping is the reduction in the response time of the north seeking magnet. In effect, the dynamics of north seeking marine compasses are the result of compromise. In accordance with the present invention, however, the changes in the ship's direction are immediately sensed whereas the heading information displayed may be the result of averaging the instantaneous changes prior to display. Thus the dynamics of the compass of the present invention are no longer the result of a forced compromise but one of design choice, a further advance over conventional marine compasses.

Finally, it is possible, in accordance with the present invention, to independently control the dynamics of the digital heading display and the on course indicator so that the digital heading display provides relatively long-term heading information while the on course indicator provides shorter term information more useful for steering.

Other objects and advantages of the invention will be set forth in part hereafter and in part will be obvious herefrom or may be learned by practice with the invention, the same being realized and attained by means of the instrumentalities, combinations and improvements herein shown, described and claimed.

BRIEF DESCRIPTION OF THE DRAWINGS

Serving to illustrate exemplary embodiments of the invention are the drawings, of which:

FIG. 3 is a schematic diagram of a flux sensor according to the invention, which flux sensor has a synchro-type output;

FIG. 5 is a schematic block diagram of a compass according to the invention illustrating one type of phase locked loop;

FIG. 6 is a schematic block diagram of a compass according to the invention illustrating a second type of phase locked loop; and FIG. 7 is a schematic diagram of a compass according to the invention illustrating a third type of phase locked loop.

DETAILED DESCRIPTION

THE COMPASS

Figure 1A:
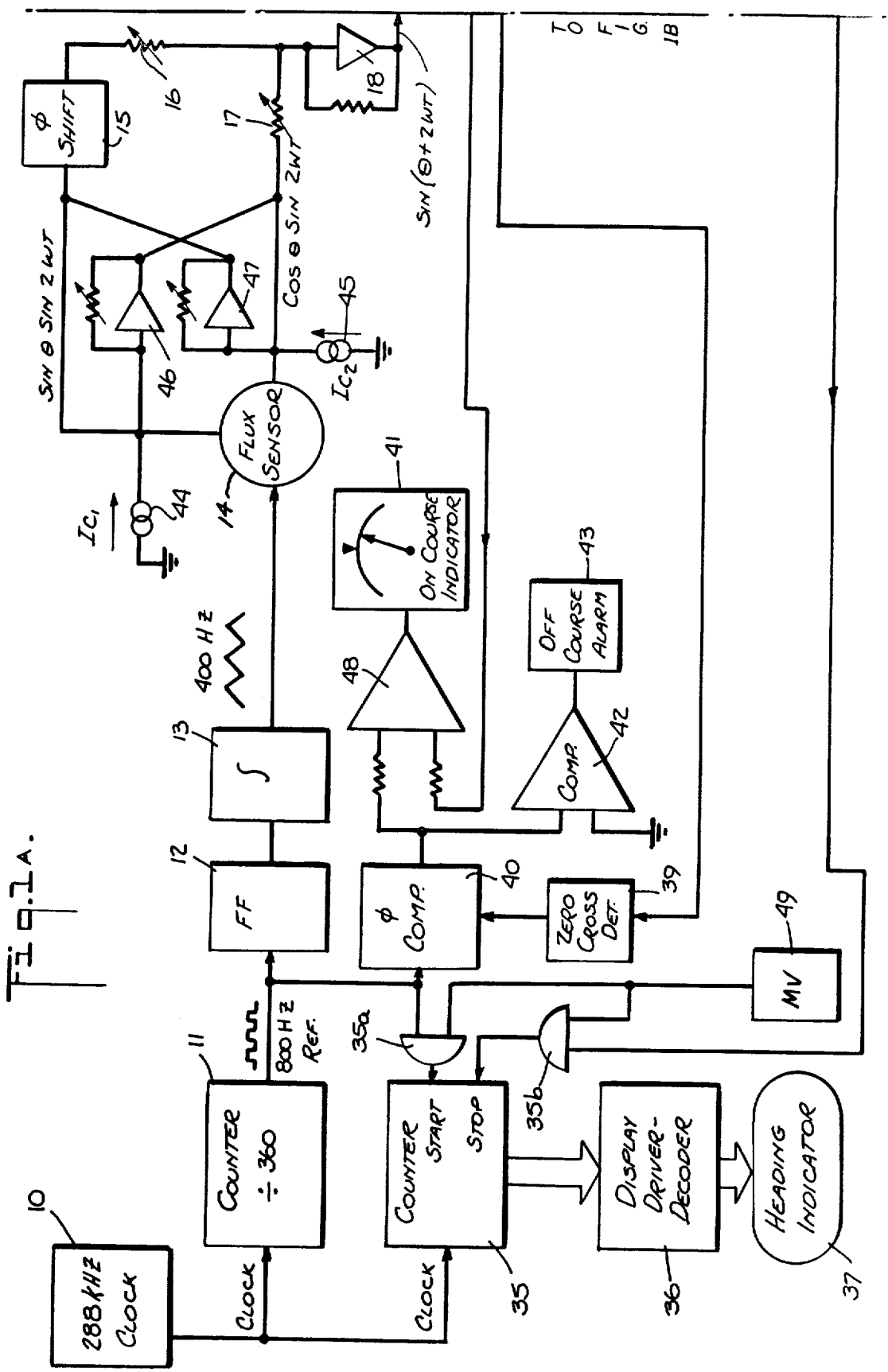
FIG. 1 (FIGS. 1A and 2A) is a schematic block diagram of a compass according to the invention.

FIG. 1 is a schematic block diagram of a compass in accordance with the present invention and constitutes a preferred embodiment thereof. The compass includes a flux sensor and associated circuitry for developing a signal which is a function of the relative direction of the horizontal component of the earth's magnetic field vector with respect to the flux sensor. A phase locked loop derives from that signal an output signal having phase proportional to the relative direction of the horizontal component. Display circuitry converts the phase information into a useful presentation of relative direction. The flux sensor may be of known construction. Known flux sensors include Flux Gates, Hall Effect devices and electro-mechanical earth inductors.

The system timing of the compass of FIG. 1 is controlled by a free-running clock 10 which produces an output pulse train at a frequency of 288K Hertz. Clock 10 is of conventional design and may be crystal-controlled to provide the desired degree of stability. The output of clock 10 goes to counter 11 which divides the clock output by 360 to produce an 800 Hertz square wave reference output signal. Counter 11 is of conventional design and may, for example, be a three-decade binary-coded-decimal counter. The output of counter 11 goes to flip flop 12 which divides the counter output by 2 to produce a 400 Hertz square wave signal. The output of flip flop 12 goes to integrator 13 which transforms the 400 Hertz square wave signal into a 400 Hertz triangular-shaped waveform containing 400 Hertz as a fundamental component, designated sin(wt).

The 400 Hertz triangular-shaped waveform produced by integrator 13 excites the primary winding of flux sensor 14, certain preferred embodiments of which are described in detail later. Certain other, e.g., trapezoidal, waveforms may be used to excite the flux sensor. Flux sensor 14 is gimbal mounted to facilitate measurement of the horizontal component of the earth's magnetic field vector. The configuration of the flux sensor is such that the excitation of the primary winding in the presence of the earth's magnetic field produces, in the secondary windings, two signals containing the second harmonic of the excitation frequency. The outputs of flux sensor 14 thus contain components proportional to $\cos\theta \sin(2wt)$ and $\sin\theta \sin(2wt)$, where $\theta$ is the angle between the ship's direction and the horizontal component of the earth's magnetic field vector. The outputs are, therefore, in resolver-type format. The signal $\sin\theta \sin(2wt)$ is transformed by phase shifter 15 into $\sin\theta \cos(2wt)$. Phase shifter 15 may comprise an operational amplifier configured as an integrator.

The signals $\sin\theta \cos(2wt)$ and $\cos\theta \sin(2wt)$ are combined by summing resistors 16 and 17 and summing amplifier 18 in accordance with the following trigonometric indentity: $(\sin a)(\cos b) + (\cos a)(\sin b) = \sin(a+b)$, to derive a signal which is a function of the desired angle $\theta$ and the second harmonic of the fundamental excitation frequency.

Thus the output of summing amplifier 18 includes the desired signal, proportional to $\sin(\theta+2wt)$, as well as numerous other harmonics of the 400 Hertz excitation frequency. The complex signal appearing at the output of amplifier 18 is processed by active filter 19 which serves to attenuate the higher order harmonics. The active filter may be of either conventional bandpass or low pass design and may, for example, comprise an operational amplifier with suitable resistive capacitive feedback coupling.

The output of active filter 19 is processed in a phase locked loop comprising phase comparator 20, low pass filter 21, voltage controlled oscillator-processor 22, flip flop 23, EXCLUSIVE OR gate 24, integrators 25 and 26, inverter 27, variation correction network 30 and zero crossing detector 34. A useful reference on phase locked loop techniques is "Phaselock Techniques" by Floyd M. Gardner, John Wiley & Sons, Inc. (1966).

The output of active filter 19 goes to phase comparator 20, the second input to which is an 800 Hertz square wave signal. Phase comparator 20 is of conventional design and multiplies the output of active filter 19 by the 800 Hertz square wave signal produced by zero crossing detector 34. The output of phase comparator 20 includes the second harmonics information generated by flux sensor 14. This information is further processed by lowpass filter 21, which removes unwanted higher order harmonic components from the comparator output.

The output of low pass filter 21 controls voltage-controlled oscillator-processor 22 which has a nominal output frequency of 1600 Hertz. As is shown in FIG. 1, the frequency of V.C.O. 22 may be synchronized from a clock input 10a, which may correspond to clock 10 or may be derived therefrom. Synchronizing the frequency of V.C.O. 22 with the system clock optimizes the lock-on characteristics of the phase locked loop, thereby permitting an independent choice of the closed loop parameters which govern the low frequency performance. The 1600 output frequency of V.C.O. 22 is fed to flip flop 23 which divides by 2 to form an 800 Hertz square wave.

The output from the phase locked loop is derived from flip flop 23. The phase of this signal with respect to the 800 Hertz reference is a measure of the angle $\theta$ between the direction of the ship and either true north or magnetic north, depending on the setting of the variation correction network which is described in greater detail later. Assuming no variation correction, the phase of the output signal is a measure of the angle $\theta$ between the ship's direction and magnetic north.

The output signal from the phase locked loop is fed to AND gate 35b while the second input thereto is from free running multivibrator 49. AND gate, 35a also receives an input from free running multivibrator 49 as well as the 800 Hertz reference frequency. Counter 35 continuously receives as an input the pulse train from clock 10. The output from AND gate 35a starts counter 35, while the output from AND gate 35b terminates counter 35. Assuming no variation correction, the difference in phase between the positive going edges of the reference signal and the output signal from the phase locked loop corresponds to the angle $\theta$ between magnetic north and ship's direction. The output of counter 35 is fed to display driver/decoder 36 and then to heading indicator 37 for visual presentation.

The nature of the north sensing compass of FIG. 1 is that it immediately senses the direction of the ship with respect to magnetic north, i.e., the value of the angle $\theta$. It is undesirable from the standpoint of a human observer, to undate the digital display at an 800 Hertz rate since the presentation would be blurred due to instantaneous changes in the ship's direction. Therefore, in the compass of FIG. 1, the display of the angle $\theta$ is periodically updated. Free-running multivibrator 49 performs this update function by producing an enable output pulse approximately once every half second or at a frequency of two Hertz. This update frequency is preferably in the range 0.1 to 5 Hertz.

The outputs of flip flop 23 and V.C.O. 22 are fed to EXCLUSIVE OR gate 24 which produces an 800 Hertz square wave shifted 90° from that produced by flip flop 23. The outputs of flip flop 23 and EXCLUSIVE OR gate 24 are fed to integrators 25 and 26 respectively which produce triangular-shaped waveforms. The output of integrator 26 is fed to the 0° point of course set potentiometer 29 while the output of integrator 24 is fed to the 90° point. The outputs of integrators 25 and 26 are also fed respectively to inverter amplifiers 27 and 28. The output of inverter 27 is applied to the 270° point of course set potentiometer 29 while the output of inverter 28 is applied to the 180° point.

In addition to energizing course set potentiometer 29, the output of integrators 25 and 26 and inverter 27 are also fed to variation correctionn network 30. This network consists of fixed resistors 31 and 32 and linear potentiometer 33. The variation correction network electrically corrects for the magnetic "variation" or difference between true north and magnetic north. Adjustment of potentiometer 33 shifts the phase of the signal supplied to zero crossing detector 34 which in turn produces the square wave input to phase comparator 20. The exact mechanism of the phase shifting is explained hereafter in connection with course set potentiometer 29. When the phase of the signal to zero crossing detector 34 is shifted by an amount equal to the magnetic variation, the compass of FIG. 1 will display heading with respect to true north.

As explained above, course set potentiometer 29 is energized by the periodic, triangular-shaped waveforms produced by integrators 26 and 25 and inverter amplifiers 28 and 27, although other periodic waveforms, linear over the range of interest, may be used. Wiper 38 of potentiometer 29 is positioned to the desired angular heading, e.g., 45°, and the resultant signal is fed to zero crossing detector 39, which produces a square wave signal constituting one of the inputs to phase comparator 40. The other input to phase comparator 40 is the 800 Hertz square wave reference signal produced by counter 11. The output of phase comparator 40 is one input to summing amplifier 48, the other input being derived from filter 21 of the phase locked loop. The output of summing amplifier 48 drives on course indicator 41, which may be a conventional micro-ammeter.

The preferred phase locked loops of the present invention are characterized by low pass transfer functions, having time constants of 1 to 10 seconds or more, thereby usefully averaging the instantaeous values of the angle $\theta$. Such an averaging is desirable for eventual display of the heading information by heading indicator 37. In contrast, however, on course indicator 41 preferably utilizes data which has been subjected to less averaging. Therefore, a signal is derived from the phase locked loop before complete filtering and is added to the output of phase comparator 40 by summing amplifier 48 before feeding the result to on course indicator 41.

The output of phase comparator 40 is also sent to comparator 42 which energizes adjustable off course alarm 43 when the output of phase comparator 40 exceeds a predetermined value corresponding to, e.g., 10° off the heading selected by course set potentiometer 29.

As described above, course set potentiometer 29 is used to select the desired course while on course indicator 41 monitors the faithfulness with which the ship adheres to the selected course. Potentiometer 29, which may be resistive or inductive, contains a linear potentiometric element such as a linear resistor and has a linear shaft calibration such that wiper 38 thereof linearly interpolates between angles, e.g., 0° and 90° as shown in FIG. 1. Course set potentiometer 29 is, in effect, a linear phase shifter and its operation can be understood by reference to FIG. 4a which shows the relationship between the waveforms energizing the 0° and 90° points. The signal energizing the 0° point is shown as a solid line while that energizing the 90° point is shown as a dotted line.

If, as shown in FIG. 1, wiper 38 of linear potentiometer 29 is positioned at the 45° point, then the signal amplitude at wiper 38 will comprise one half the signal amplitude appearing at the 0° point plus one half the signal amplitude appearing at the 90° point. FIG. 4b depicts the waveform of this resultant signal when wiper 38 is positioned at the 45° point. It will be noted that this signal crosses the zero axis at $\pi/4$. Similiarly, if wiper 38 were positioned at the 22.5° point on linear potentiometer 29, then the resulting signal would comprise ¾ of the 0° signal plus ¼ of the 90° signal. The wave form of the resultand signal is shown in FIG. 4c and it crosses the zero axis at $\pi/8$. Thus, while the resulting waveform appearing at wiper 38 varies widely in amplitude and shape as wiper 38 moves along linear potentiometer 29, the zero crossing point is, nevertheless shifted linearly with the linear motion of wiper 38.

Other repetitive, e.g., sawtooth, waveforms may be used which have corresponding regions of identical linear slopes and are symmetrically disposed about a reference potential.

Figure 4A:
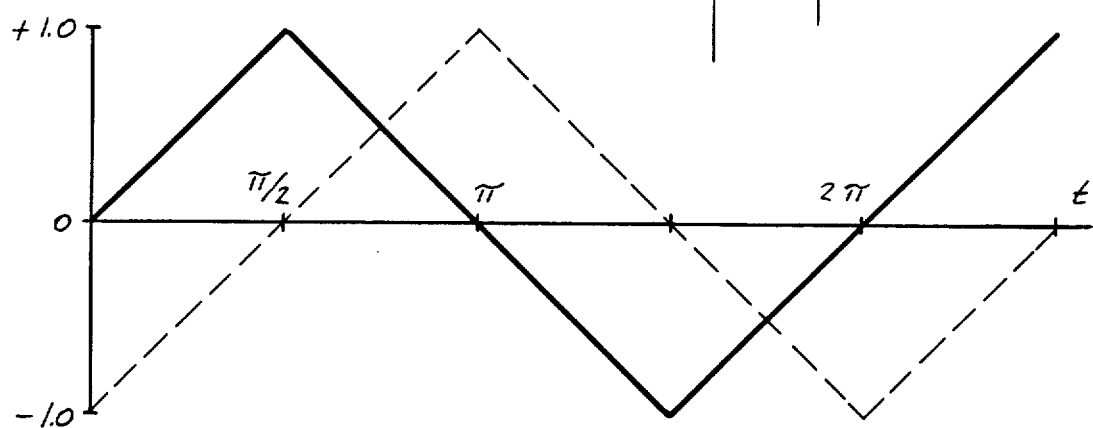
FIG. 4 is a graph illustrating the operation of the linear phase shifter of the present invention.
Figure 4B:
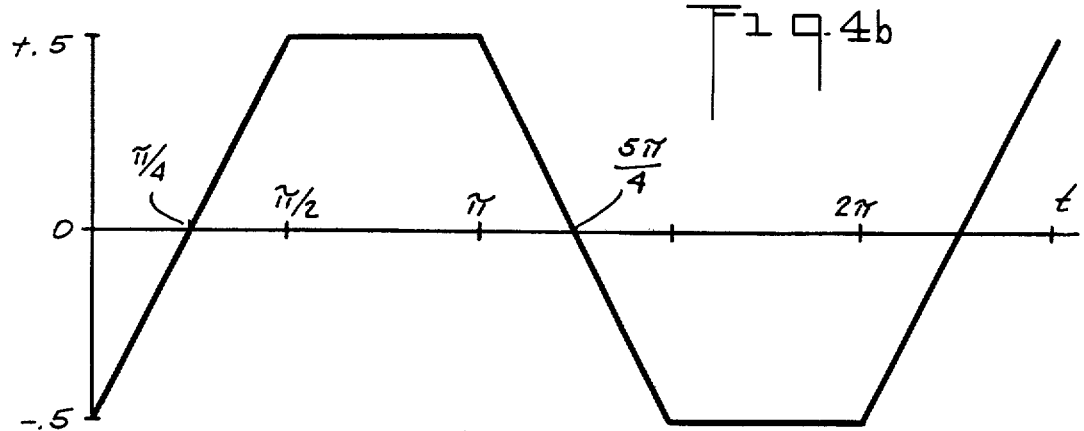
Figure 4C:
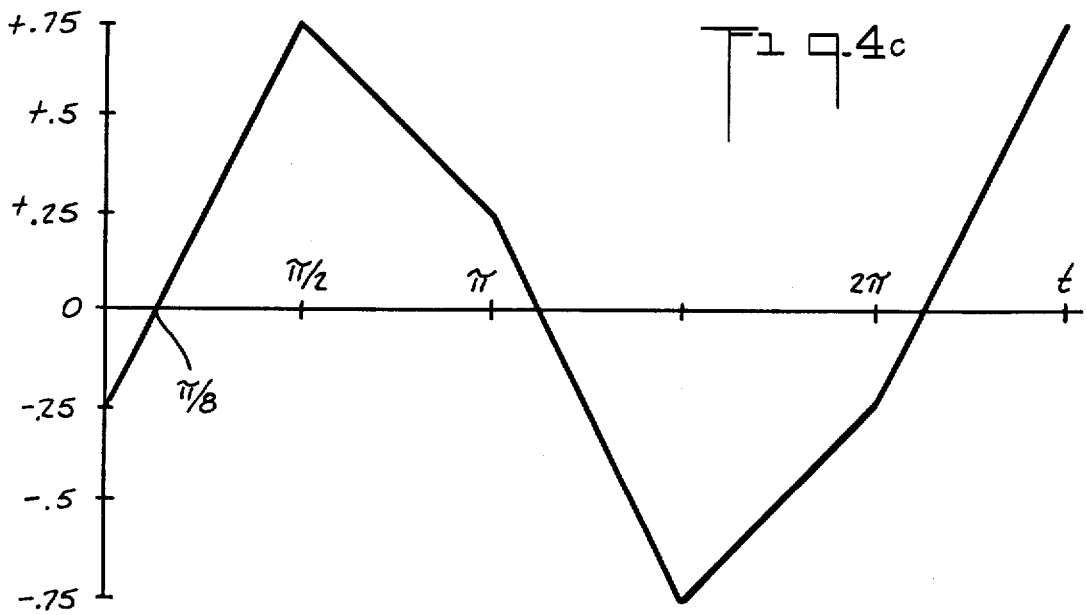
Figure 2:
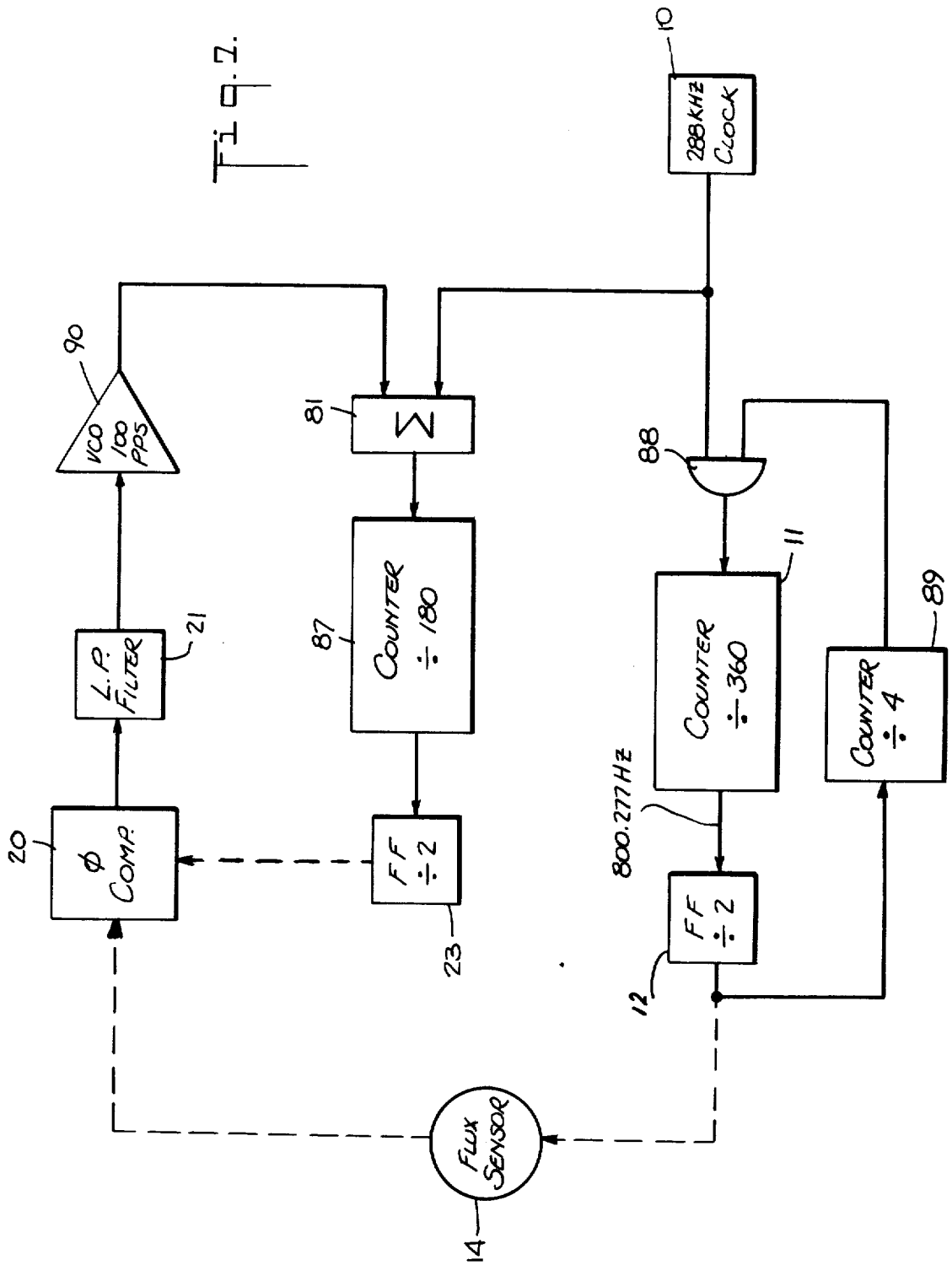

Referring to FIG. 4a, it is seen that over the range $0-\pi/2$ the waveforms are linear, have the same slopes and are symmetrically disposed about a zero reference potential, i.e., both waveforms have their minimum and maximum values, with respect to the reference, at the same points in time. One advantage of using triangular waveforms to energize potentiometer 29 is that use of zero crossing detector 39 on the waveforms generated at wiper 38 produces a symmetrical square wave having zero crossing shifted linearly in accordance with the linear rotation of wiper 38, e.g., at $\pi/4$ and $5\pi/4$ (FIG. 4i).

THE PHASE LOCKED LOOP

As described supra, voltage controlled oscillator-processor 22 may be synchronized by clock 10, thereby permitting an independent choice of the closed loop parameters governing the low frequency performance. FIG. 5 illustrates one embodiment of the compass wherein the voltage controlled oscillator-processor 22 is synchronized from the system clock 10. Those system components previously identified bear the same reference designations in FIG. 5.

Clock 10 generates a 288K Hertz output signal which is divided by counter 11 to form the 800 Hertz reference signal. Flip flop 12 further divides the counter output by two to produce the 400 Hertz signal which, after further processing, is used to energize flux sensor 14. The 800 Hertz second harmonic component of the flux sensor output is operated upon as indicated in FIG. 1 and then fed to phase comparator 20 where it is compared with the phase locked loop output signal appearing at flip flop 23. The manner in which the phase locked loop generates that output signal will be described in greater detail.

The output from phase comparator 20 is filtered by low-pass filter 21 to produce a phase sensitive error signal which controls VCO 80 which in turn generates pulses in the range 0–100 PPS in response to the error signal. The output from VCO 80 goes to summer 81 which has as its second input the 288 K Hertz clock frequency, indicated as input 10a to voltage controlled oscillator-processor 22. The output from summer 81 has a nominal frequency of 288 K Hertz and is divided by up/down counter 82 to develop the 1600 Hertz output signal from voltage controlled oscillator-processor 22, previously described.

Up/down control 83 is connected to the putput of low-pass filter 21, is sensitive to the polarity of the error signal appearing there and controls the direction of counting of up/down counter 82. Flip flop 23 divides the 1600 Hertz output signal from the voltage controlled oscillator-processor 22 by two to develop the 800 Hertz phase locked loop output signal fed to phase comparator 20. The difference in phase between the 800 Hertz reference signal produced by counter 11 and the 800 Hertz output signal from the phase locked loop is a measure of the difference between the ship's direction and magnetic north (assuming no variation correction).

The nominal operating conditions for the phase locked loop are such that VCO 80 produces zero output and flip flop 23 produces an 800 Hertz output signal. As the signals produced by flux sensor 14 shift in phase in response to the changing direction of the ship, an error signal is developed at the output of low pass filter 21 which causes VCO 80 to produce pulses at, e.g., 20 PPS. These pulses are summed with the 288 K Hertz clock frequency and drive up/down counter 82 in the direction indicated by up/down control 83 so as to produce an output signal at flip flop 23 having the required phase relation with the signals produced by flux sensor 14. In this manner the phase locked loop tracks the flux sensor output.

Another embodiment of the invention is illustrated in FIG. 6. Once again, those system elements previously indentified bear the same reference designations. The embodiment of the invention disclosed in FIG. 6 differs from that of FIG. 5 in that an up/down counter is not required. Its operation is as follows.

Clock 10 develops a 288 K Hertz output signal which is fed to counter 11 by way of summer 86. Counter 11 divides by 360 to produce the 800 Hertz reference signal. Flip flop 12 divides this reference signal by two to produce the 400 Hertz waveform which is ultimately used to energize flux sensor 14. The output of flux sensor 14, including the 800 Hertz second harmonic component of interest, is fed to phase comparator 20, for comparision with the 800 Hertz output signal from the phase locked loop. If a phase error is detected, an error signal appears at the output of low pass filter 21 which causes VCO 80 to generate pulses at a rate of 0–100 PPS, depending on the magnitude of the error signal. These pulses are fed to gates 84 and 85. The error signal appearing at the output low-pass filter 21 is also fed to the input of up/down control 83.

To compensate for the phase error by counting up, pulse transfer gate 84 is enabled by the "up" output from control 93. This enables the output of VCO 80 to be fed to summer 81 which combines said output with the 288 K Hertz clock signal and feeds the result to counter 87. Counter 87 and flip flop 23 divide the resultant signal by 360 to develop the phase locked loop output signal which is used to drive phase comparator 20. In the event the phase error is to be corrected by counting down, then the "down" output from control 83 energizes pulse transfer gate 85, which permits the output of VCO 80 to go to summer 86 where it is combined with the clock signal and transmitted to counter 11 which in turn divides by 360 to develop the 800 Hertz reference signal. Thus, error correction by counting up is performed using counter 87 while error correction by counting down is accomplished by means of counter 11.

A third embodiment of the phase locked loop of the invention is illustrated in FIG. 7. Those system elements previously identified again bear the same reference designations. The embodiment of FIG. 7 is considerably simpler than that of either FIG. 6 or FIG. 5. Thus, an up/down control and gating are dispensed with, as well as the need for an up/down counter. The embodiment of FIG. 7 operates as follows.

Clock 10 generates a 288 K Hertz signal which is fed to OR Gate 88, to counter 11 which divides by 360 and to flip flop 12 which divides by two. A feedback loop comprising divide by four counter 89 is connected between the output of flip flop 12 and the input of OR Gate 88. The output of counter 89 is approximately 100 pulses per second. The net effect of this feedback arrangement is to produce, at the output of counter 11, a reference signal having a nominal frequency of 800.277 Hertz. Thus flux sensor 14 is energized with a waveform having a fundamental component of 400.138 Hertz. The output of flux sensor 14 includes the second harmonic of the fundamental input frequency, i.e., 800.277 Hertz, which is processed as indicated in FIG. 1 and fed to phase comparator 20, the second input of which is the output of the phase locked loop.

Assuming the required phase relation exists between the two inputs to phase comparator 20, no error signal appears at the output of low-pass filter 21 and VCO 90 generates output pulses at a 100 PPS rate. The VCO pulses are combined with the 288 K Hertz output of clock 10 by summer 81 and the output of summer 81 is divided by counter 87 and flip flop 23 to produce the phase locked loop output signal, which also has a nominal frequency of approximately 800.277 Hertz.

Should the incorrect phase relationship exist between the inputs to phase comparator 20, low-pass filter 21 develops an error signal which, depending on its polarity, causes VCO 90 to generate an output pulse train at a rate higher or lower than 100 PPS. This altered output from VCO 90 is combined in the same manner with the output from clock 10 by summer 81 and divided by counter 87 and flip flop 23 to produce a signal at the output of flip flop 23 bearing the correct phase relationship with respect to the signal derived from flux sensor 14.

The advantages flowing from adoption and use of the embodiments of the phase locked loops disclosed in FIGS. 5 through 7 are immediate and substantial. Because the system clock is being used both to generate system timing and to control the basic frequency of the phase locked loop, the stability requirements for the system clock are greatly reduced. In fact, the system clock may drift substantially without impairing system accuracy. Thus, the operating temperature extremes tolerated by the system have been sybstantially broadened. This increase in performance has been accomplished with a correlative reduction in cost made possible by the phase locked loop design in that a less expensive clock may be utilized.

It will also be appreciated that because of the nature of the phase locked loop, problems traditionally associated with phase locked loops, i.e., synchronization, capture and lock on, have been virtually eliminated. And yet, while these troublesome aspects of phase locked loops have been minimized, the advantageous characteristics of phase locked loops have been retained and enhanced. One of the most significant beneficial results flowing from the use of the phase locked loops of the invention is that, when used in the digital compass of the present invention it is possible to substantially reduce the bandwidth of the phase locked loop, thereby serving to filter input data while, at the same time, not increasing the lock on time for the system.

Finally, the phase locked loops disclosed herein automatically and instantaneously correct for changes in the system clock frequency irrespective of the phase locked loop bandwidth limitations imposed for purposes of data averaging.

It will be recognized by those skilled in the art, an equivalency exists between the reference signal derived from the clock and the phase locked loop output signal. Thus, the invention disclosed and claimed herein may also be practiced by interchanging the roles of these two signals.

THE FLUX SENSOR

Figure 2:
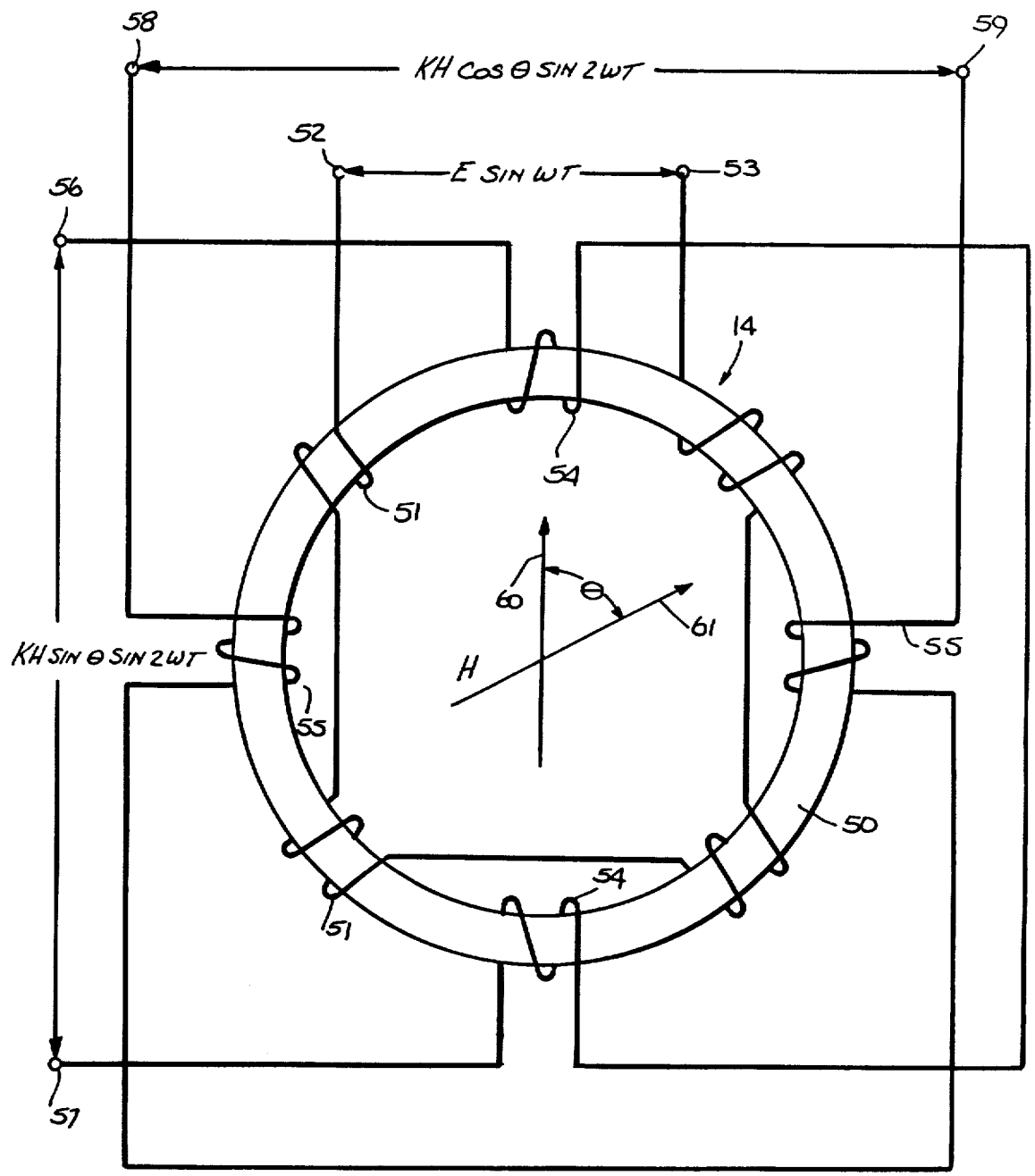
FIG. 2 is a schematic diagram of a flux sensor according to the invention, which flux sensor has a resolver-type output.
Figure 8:
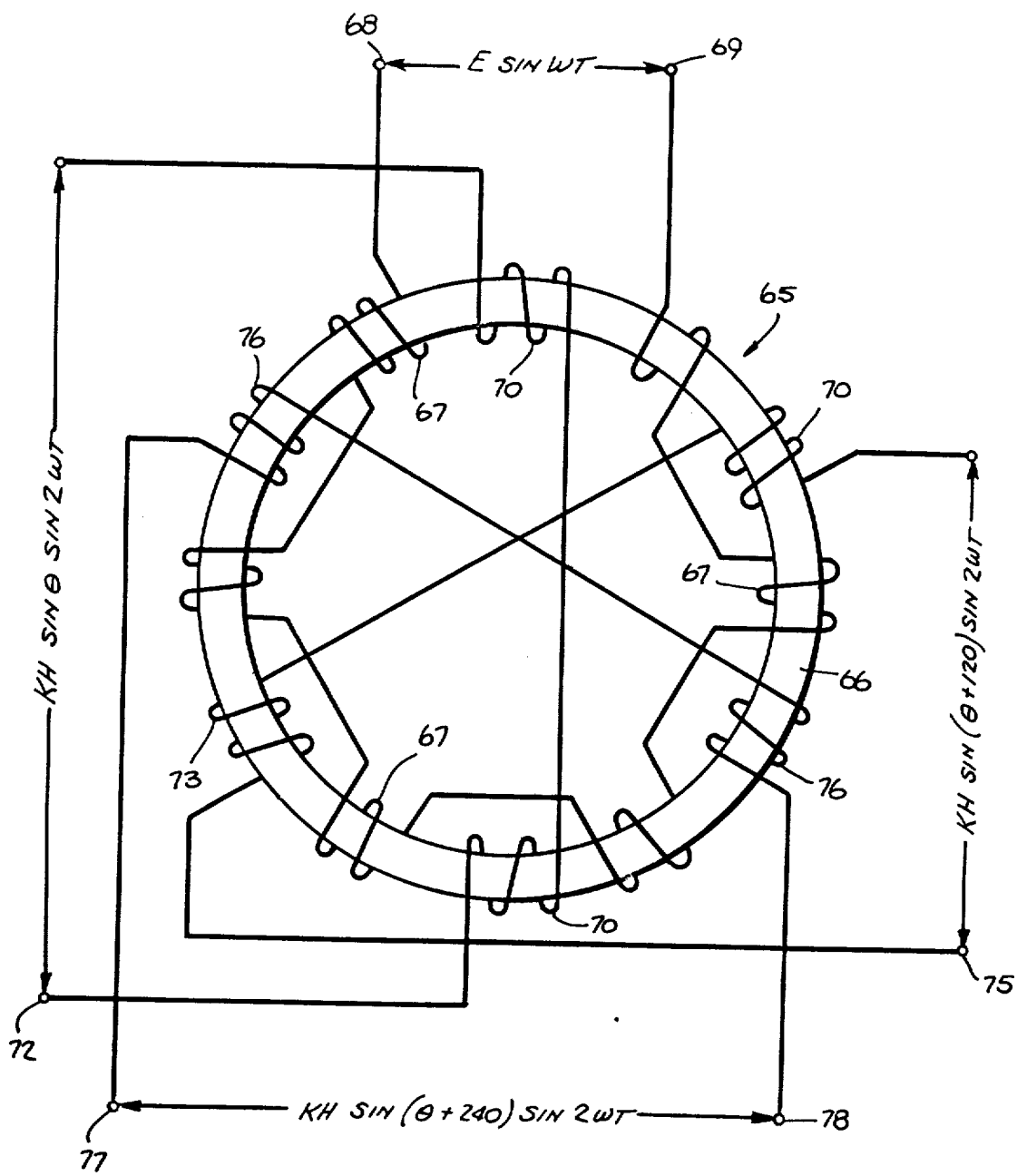

Flux sensor 14 will now be described in greater detail. Referring now to FIG. 2, one preferred flux sensor is shown to consist of a toroidally shaped magnetic member 50 having a primary winding which is energized by a voltage E sin(wt) applied across terminals 52–53. The flux sensor also has two secondary windings 54 and 55. The output from secondary winding 54 appears across terminals 56–57, while that from winding 55 appears across terminals 58–59.

The toroid 50 is of magnetic material and may be made, for example, from molybdenum permalloy tape. Magnet wire may be used for both the primary secondary windings. As shown, primary winding 51 consists of four roughly equidistant sectors, each consisting of the same number of turns. The primary winding may, however, be distributed uniformly about the circumference of toroid 50. The segregated primary winding structure shown in FIG. 2 is easier to manufacture.

Secondary windings 54 and 55 each consist of two substantially identical, oppositely disposed sections on the circumference of toroid 50. The two sections constituting each secondary winding are oppositely wound so that, in the absence of an external magnetic filed, the voltages induced therein cancel. Secondary windings 54 and 55 are orthogonal and, in the presence of a magnetic field, generate second harmonic sine-cosine data in resolver-type format. For example, if arrow 60 represents the ship's direction and arrow 61 the direction of magnetic north, then winding 54 produces a voltage proportional to $\sin\theta$, i.e., the angle $\theta$ between the ship's direction and magnetic north. Similarly, winding 55 produces a signal proportional to $\cos\theta$.

While the flux sensor shown in FIG. 2 utilizes a single toroid having a primary winding and two secondary windings, it is also possible to utilize two matched toroids, each containing a single secondary winding. One toroid would then produce a signal proportional to $\sin\theta$ while the other would produce a signal proportional to $\cos\theta$.

FIG. 3 discloses another preferred flux sensor 65 which produces output data in synchro-type format. Flux sensor 65 has a toroidal magnetic member 66 and a primary winding 67 energized by a signal E sin(wt) across terminals 68–69. Primary winding 67 may be distributed around toroid 66 or may be segregated as shown in FIG. 3.

About toroid 66 are distributed 3 pairs of secondary windings spaced 120° apart. Secondary winding 70 produces, across terminals 71–72, a voltage proportional to $\sin\theta$, where $\theta$ again is the angle between the ship's direction and magnetic north. Secondary winding 73 produces, across terminals 74–75, a signal proportional to $\sin(\theta+120)$, while winding 76 produces, across terminals 77–78, a signal proportional to $\sin(\theta+240)$.

The flux sensor of FIG. 3, which produces output data information in synchro-type format, may be utilized in the digital compass of FIG. 1. All that need be done is to convert the synchro-type data into resolver-type data. Such techniques are disclosed in U.S. Pat. No. 3,493,735 for "Computer Circuits For Processing Trigonometric Data," which issed on Feb. 3, 1970 to the inventors of the present invention and is incorporated herein by reference.

Since the operation of the flux sensors shown in FIGS. 2 and 3 depends upon the saturation of the toroid and the presence of the earth's magnetic field, it is necessary to excite the respective primary windings with a voltage which will cause the toroid to go into saturation.

ERROR CORRECTION

In accordance with the present invention there are disclosed several techniques for electrically correcting various types of erros associated with magnetic field direction measuring devices.

One type of error is the magnetic "variation" or difference between true north and magnetic north. As shown in FIG. 1, a variation correction network 30 may be used to electrically correct for the variation so that indicator 37 will display heading with respect to true north. This variation correction technique is an extremely useful, practical navigational aid.

In addition to magnetic variation error, there are also magnetic "deviation" errors due to spurious local magnetic fields induced, for example, by DC currents or nearby magnets. Also, the toroid itself usually possesses traces of residual magnetism. Absent adequate compensation, these spurious local magnetic fields would cause errors in the compass reading. To compensate these magnetic deviation errors a magnetic bias may be established in the toroid which has the effect of cancelling out the spurious local magnetic fields. This is effected by injecting low level currents into the secondary windings of the flux sensor to thereby establish a compensating magnetic bias in the toroid. These compensation currents are shown in FIG. 1 as current generators 44 and 45 producing, respectively, compensation currents $I_{c1}$ and $I_{c2}$.

Another type of magnetic deviation error exists because of the presence of local ferrous metal. This deviation error may be considered to consist of two components. The first component peaks at the cardinal compass points while the second peaks at the intercardinal points. Each component of deviation error is compensated in a different manner.

The deviation errors which peak at the cardinal points may be electrically compensated by cross-coupling the sine/cosine data appearing in the secondary windings of flux sensor 14. As shown in FIG. 1, operational amplifiers 46 and 47 effect this cross-coupling. This compensation technique may also be used to correct for the fact that the secondary windings of flux sensor 14 may not be precisely orthogonal as required by yield true sine/cosine data.

The deviation errors which peak at the intercardinal points may be compensated for by adjusting the sine and cosine scaling factors. This is accomplished in FIG. 1 by variable summing resistors 16 and 17. Thus, as disclosed herein, error compensation may be effected electrically without resort to the mechanical compensation techniques employed when dealing with conventional north seeking marine compasses.

OTHER APPLICATIONS

The principles and techniques disclosed herein for the measurement of magnetic fields find a wide variety of applications. One such application is reading the position of a magnetized shaft in the absence of any physical coupling to or loading of the shaft. For example, if the end of a shaft were magnetized in a preferred direction and the flux sensor of FIGS. 2 or 3 placed proximate thereto, the movemnt of the magnetized shaft with respect to the flux sensor will be analogous to the movement of a ship-mounted flux sensor with respect to magnetic north. The information generated can, in both instances, be processed in the same manner. In one case the result is a measure of heading of a ship with respect to magnetic north whereas in the other, the result is a measure of the shaft position with respect to the flux sensor.

In general, the output from the flux sensors of FIGS. 2 and 3 may be used by remote indicating devices similar to those capable of responding to resolver and synchro data.

The invention disclosed and claimed herein is not limited to the specific mechanisms and techniques herein shown and described since modifications will undoubtedly occur to those skilled in the art. Hence departures may be made from the form of the invention without departing from the principles thereof.

What is claimed is;

1. Apparatus for measuring the direction of a magnetic field in the presence of deviation error sources including:
   a. flux sensor means comprising a magnetic member, said sensor having a plurality of sensor outputs;
   b. excitation means operably connected to said flux sensor for saturating said flux sensor in the presence of said magnetic field to thereby produce sensor output signals which are functions of the relative direction of said magnetic field with respect to a predetermined axis of said flux sensor;
   c. means responsive to said sensor output signals for deriving therefrom an output signal proportional to said relative direction of said magnetic field;
   d. means responsive to said output signal for producing an indication of said relative direction of said magnetic field; and
   e. compensation means operably connected to at least one of said sensor outputs for electrically compensating for magnetic deviation errors caused by said magnetic deviation error sources.

2. Apparatus according to claim 1 wherein said compensation means comprises means for injecting into at least one of said sensor outputs an electrical compensation current.

3. Apparatus according to claim 1 wherein said compensation means comprises means coupled between at least two of said sensor outputs for cross-coupling at least one of said sensor output signals.

4. Apparatus according to claim 1 wherein said compensation means comprises means coupled to at least one of said sensor outputs for adjusting the amplitude of said sensor output signal.

5. Apparatus according to claim 1 wherein said compensation means comprises means for adjusting the phase of at least one of said sensor output signals.

6. Apparatus according to claim 1 wherein said magnetic field is the earth's magnetic field and wherein said means responsive to said sensor output signals comprises phase locked loop means responsive to said sensor output signals for developing an output signal having phase proportional to said relative direction of said magnetic field, said phase locked loop means including variation correction means for electrically correcting for the difference between true north and magnetic north by shifting the phase of said output signal a predetermined amount.

7. A magnetic field direction sensing compass including:
   a. flux sensor means comprising a magnetic member, said sensor having a plurality of sensor outputs;
   b. a reference signal;
   c. excitation means operably connected to said flux sensor for saturating said flux sensor in the presence of the earth's magnetic field with an energizing signal derived from said reference signal to thereby produce sensor output signals which are functions of the relative direction between magnetic north and a predetermined axis of said sensor;
   d. phase locked loop means responsive to said sensor output signals for deriving therefrom an output signal having phase proportional to said relative direction;
   e. variation correction means responsive to one of said reference and output signals for electrically correcting for the difference between true north and magnetic north by shifting the phase of said one signal s predetermined amount; and
   f. means responsive to the phase of said output signal for producing an indication of said direction relative to true north.

8. A compass according to claim 7 further including:
   a. means for combining said sensor output signals to produce a phase sensitive input signal;
   b. comparator means responsive to differences in phase between said input signal and said phase locked loop output signal for producing an error signal;
   c. means for generating a correction signal in response to said error signal; and
   d. counter means responsive to both said reference signal and said correction signal for shifting the phase of said phase locked loop output signal so as to reduce said error signal.

9. A compass according to claim 7 wherein said variation correction means is part of said phase locked loop means and wherein electrical correction for the difference between true north and magnetic north is effected by shifting the phase of said phase locked loop output signal.

10. Apparatus for measuring the direction of a magnetic field including:
    a. flux sensor means comprising a magnetic member, said flux sensor having a plurality of sensor outputs;
    b. a reference signal;
    c. excitation means operably connected to said flux sensor for saturating said flux sensor in the presence of said magnetic field with an energizing signal derived from said reference signal to thereby produce sensor output signals which are functions of the relative direction of said magnetic field with respect to a predetermined axis of said flux sensor;

d. means for combining said sensor output signals to produce a phase sensitive input signal;

e. comparator means responsive to differences in phase between said input signal and said phase locked loop output signal for producing an error signal;

f. means for generating a correction signal in response to said error signal; and g. counter means responsive to both said reference signal and said correction signal for shifting the phase of said phase locked loop output signal so as to reduce said error signal.

11. Apparatus according to claim 10 wherein said magnetic field is the earth's magnetic field and further including variation correction means responsive to one of said reference and output signals for electrically correcting for the difference between true north and magnetic north by shifting the phase of said one signal a predetermined amount.

12. Apparatus for measuring the direction of a magnetic field including:

a. flux sensor means comprising a magnetic member, said flux sensor having a plurality of sensor outputs;

b. clock means for producing a reference signal having a frequency $f_1$;

c. means responsive to said reference signal for deriving therefrom an intermediate signal having frequency $f_2$;

d. means responsive to said reference signal and said intermediate signal for combining same and dividing the result to produce an energizing signal having frequency $(f_3)/2$;

e. excitation means responsive to said energizing signal and operably connected to said flux sensor for saturating said flux sensor with said energizing signal in the presence of said magnetic field to thereby produce sensor output signals which are functions of the relative direction of said magnetic field with respect to a predetermined axis of said flux sensor;

f. means for combining said sensor output signals to produce a phase sensitive input signal with a component having frequency $f_3$;

g. phase locked loop means responsive to said input signal and said reference signal for deriving therefrom an output signal having a nominal frequency of $f_3$ and phase proportional to said relative direction of said magnetic field; and h. means responsive to the phase of said output signal for producing an indication of said relative direction of said magnetic field.

13. Apparatus according to claim 8 wherein said phase locked loop means includes:

a. means for generating an error signal in response to variations in phase between said input signal and said phase locked loop signal;

b. means for generating a correction signal in response to said error signal; and c. counter means responsive to said reference signal and said correction signal for varying the phase of said phase locked output signal so as to reduce said error signal.

14. Apparatus according to claim 11 wherein said magnetic field is the earth's magnetic field and wherein said phase locked loop means includes variation correction means for electrically correcting for the difference between true north and magnetic north by shifting the phase of said phase locked loop output signal a predetermined amount.

15. A magnetic field direction sensing compass including:

a. flux sensor means comprising a magnetic member, said flux sensor having a plurality of sensor outputs;

b. a reference signal;

c. excitation means responsive to said reference signal and operably connected to said flux sensor for saturating said flux sensor in the presence of the earth's magnetic field to thereby produce sensor output signals which are functions of the relative direction between north and a predetermined axis of said sensor;

d. means for combining said sensor output signals to produce a phase sensitive input signal;

e. phase locked loop means responsive to said phase sensitive input signal for deriving therefrom an output signal having phase proportional to said direction relative to north and averaging the instantaneous values of said direction relative to north;

f. course set means responsive to one of said reference and output signals for selecting a desired course by shifting the phase of said one signal;

g. on course indicating means responsive to the output of said course set means and the other of said reference and output signals for indicating whether the selected course is being followed; and h. indicating means responsive to said output signal for producing an indication of said direction relative to north.

16. A compass according to claim 14 wherein said excitation means includes means for generating an energizing signal characterized by triangular-shaped waveforms for saturating said flux sensor.

17. A compass according to claim 15 wherein said phase locked loop means includes means responsive to said phase sensitive input signal for developing an intermediate signal averaged to a lesser extent than said output signal and wherein said on course indicator means is responsive to said intermediate signal for indicating short term changes from said selected course.

18. A compass according to claim 14 further including off course alarm means responsive to said course set means and said other of said reference and output signals for indicating when the actual course differs from the selected course by more than a predetermined amount.

19. A compass according to claim 15 wherein said means for producing said indication of said direction relative to north includes digital display means which is updated at a frequency within the range of approximately 0.1 to 5 Hertz.

20. A compass according to claim 15 wherein said course set means includes means responsive to said one of said reference and output signals for deriving therefrom linear waveform signals for energizing said course set means.

21. A compass according to claim 15 further including waveform generator means responsive to said one of said reference and output signals for generating first and second triangular, repetitive signals having the same amplitude and shifted by $\pi/2$ with respect to each other and wherein said course set means comprises linear potentiometric means with a wiper having a linear shaft calibration, said potentiometric means being responsive to said first and second triangular signals for combining same in complementary fashion to produce a resultant signal having zero crossing shifted linearly with shaft rotation.

22. A compass according to claim 15 further including:
  a. comparator means responsive to differences in phase between said input signal and said phase locked loop output signal for producing an error signal;
  b. means for generating a correction signal in response to said error signal; and
  c. counter means responsive to both said reference signal and said correction signal for shifting the phase of said phase locked loop output signal so as to reduce said error signal.

* * * * *

Disclaimer 3,903,610.—*John B. Heaviside*, Huntington, and *Franklin W. Smith, Jr.*, Hauppauge, N.Y. APPARATUS FOR MEASURING MAGNETIC FIELD DIRECTION. Patent dated Sept. 9, 1975. Disclaimer filed July 17, 1978, by the assignee, *Safe Flight Instrument Corporation*.
Hereby enters this disclaimer to claims 1 and 2 of said patent.

[*Official Gazette September 5, 1978.*]